Patented Nov. 6, 1934

1,979,534

UNITED STATES PATENT OFFICE 1,979,534

DISAZO COMPOUND FOR THERAPEUTIC USE

Joseph Ebert, Westmont, N. J., assignor to The Farastan Company, Philadelphia, Pa., a corporation of Pennsylvania No Drawing. Application October 15, 1931, Serial No. 569,119

19 Claims. (Cl. 260—76)

This invention relates to new disazo compounds for therapeutic use. It includes the new compounds, therapeutic compositions comprising these new compounds, and the method of preparing the new compounds.

In order to produce disazo compounds having the desirable therapeutic properties of the compounds of this invention, it has been found necessary to couple a disazotized diamine nucleus with a substituted aromatic amine and a substituted aromatic carboxylic acid. The substituted aromatic amine may be either an alkoxy amine or a diamine such as $$C_6H_4(NH_2)OCH_3$$

or $$C_6H_4(NH_2)_2.$$

The substituted aromatic carboxylic acid may be an aromatic amino carboxylic acid or an aromatic hydroxy carboxylic acid, such as $$C_6H_4(OH)COOH$$

or $$C_6H_4(NH_2)COOH;$$

it may contain both an amino group and an hydroxy group such as $$C_6H_3-NH_2(OH)COOH;$$

it may contain other substituents such as $$C_6H_3-CH_3(OH)COOH.$$

The nucleus of the disazo compound may be a phenyl residue, a diphenyl residue, or a diphenyl methane residue. The residue may contain alkyl or alkoxy substituents, for example—

$$-N=N-C_6H_3-CH_3-N=N-,$$

$$-N=N-C_6H_3-OCH_3-C_6H_3-OCH_3-N=N-,$$

or $$-N=N-C_6H_3-OC_2H_5-CH_2-C_6H_3-OC_2H_5-N=N-.$$

The disazo compounds of this invention are non-toxic. They contain no nitro, sulfonic, chlorine, bromine or iodine groups.

The disazo compounds of this invention possess pronounced bactericidal and bacteriostatic value and have a distinct analgesic action. The bactericidal value is at least 1 to 1500 and the bacteriostatic value is at least 1 to 2000. The compounds are yellow to brown in color, for example yellowish brown or reddish brown. Their alkali salts are practically insoluble in water but their hydrochlorides and sulfates are more or less freely soluble in water. The low toxicity of these compounds, their colloidal character and their color make them particularly advantageous for use in the treatment of intestinal and genito-urinary disorders. The compounds may be used in the form of their alkali salts, their hydrochlorides, their sulfates, or their free bases, all of which are soluble in the common organic solvents, such as ethyl alcohol and other alcohols and acetone.

The following examples illustrate the invention, but it is intended and is to be understood that the invention is not limited to the specific examples given below. In connection with Example 1 the method of preparation is given somewhat in detail. The other examples may be prepared by tetrazotizing one molecular weight of the diamino nucleus and coupling this with one molecular weight of a substituted amine (either an alkoxy amine or diamine), and one molecular weight of an aromatic carboxylic acid (either an amino carboxylic acid or an hydroxy carboxylic acid). The compounds which are obtained as salts, for example sodium salts, may be purified and the hydrochlorides or sulfates or the free bases may be formed from the salts in the manner well-known in the art.

The nucleus of each of the disazo compounds of the first eight examples is diphenyl. These compounds are prepared by tetrazotizing benzidine. The tetrazo nuclei of Examples 9 and 10 are modified diphenyl groups. The nuclei of Examples 11 and 12 is the phenylene group, and the nuclei of Examples 13 and 14 is the toluyl group. Examples 15 to 18 are prepared by tetrazotizing diamino derivatives of diphenyl methane or modified diphenyl methane.

Example 1

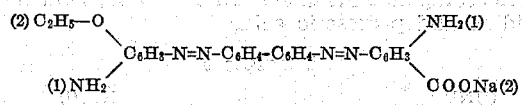

Sodium salt of diphenyl-disazo-o-ethoxy-amino phenol-o-amino benzoic acid 18.6 parts by weight of benzidine are heated with 80 parts of concentrated hydrochloric acid (or the corresponding amount of benzidine hydrochloride may be used) and dissolved or suspended in approximately 250 parts of water. The solution is tetrazotized with a solution of 14.2 parts of sodium nitrite in 60 parts of water keeping the temperature at approximately 15° C. This tetrazo solution is then coupled with a solution of 14 parts of o-phenetidine in 12 parts of concentrated hydrochloric acid and 150 parts of water mixed with a solution of 14 parts of o-amino benzoic acid in 12 parts of concentrated hydrochloric acid and 100 parts of water. The coupling is carried out at a temperature of approximately 15 to 25° C. The solution is then made alkaline by the addition of a 10 to 20 percent sodium hydroxide solution. The sodium salt of the new disazo compound separates out as a yellowish-brown precipitate. This precipitate is washed with water until free from chloride and then dried. The compound is purified by recrystallization from ethyl alcohol.

Example 2

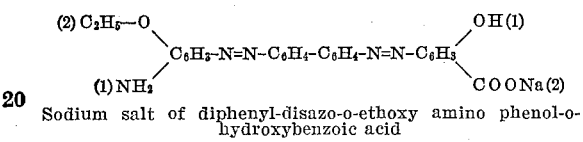

Sodium salt of diphenyl-disazo-o-ethoxy amino phenol-o-hydroxybenzoic acid

This compound is prepared from benzidine, o-phenetidine and salicylic acid.

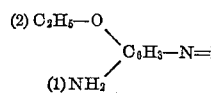

Example 3

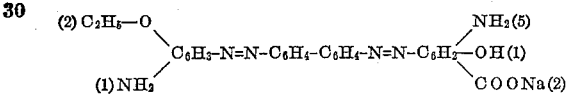

Sodium salt of diphenyl-disazo-o-ethoxy-amino phenol-amino hydroxybenzoic acid

This compound is prepared from benzidine, o-phenetidine and 5-amino hydroxybenzoic acid.

Example 4

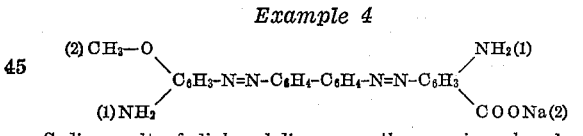

Sodium salt of diphenyl-disazo-o-methoxy-amino phenol-o-amino benzoic acid

This compound is prepared from benzidine, o-anisidine and o-amino benzoic acid.

Example 5

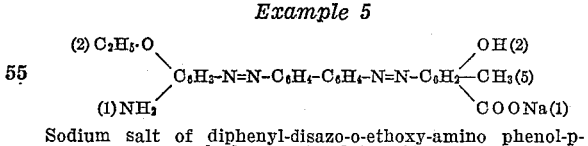

Sodium salt of diphenyl-disazo-o-ethoxy-amino phenol-p-hydroxymetatoluic acid

This compound is made from benzidine, o-phenetidine and p-cresotic acid.

Example 6

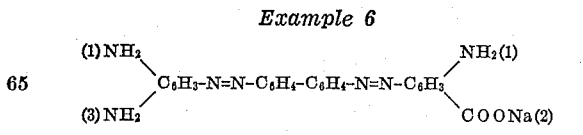

Sodium salt of diphenyl-disazo-diamino-benzene-o-amino benzoic acid

This compound is made from benzidine, m-phenylene diamine and o-amino benzoic acid.

Example 7

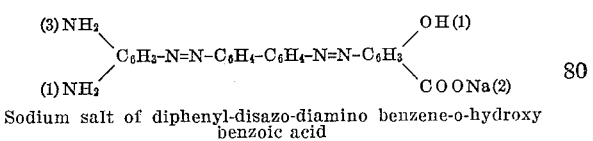

Sodium salt of diphenyl-disazo-diamino benzene-o-hydroxy benzoic acid

This compound is made from benzidine, m-phenylene diamine, and salicylic acid.

Example 8

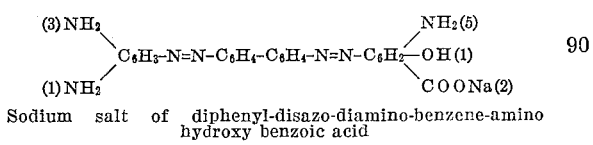

Sodium salt of diphenyl-disazo-diamino-benzene-amino hydroxy benzoic acid

This compound is made from benzidine, m-phenylene diamine and 5-amino hydroxy benzoic acid.

Example 9

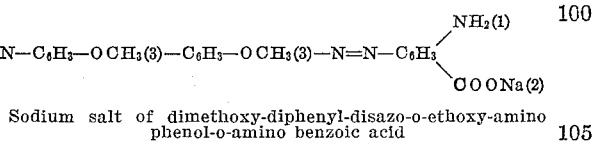

Sodium salt of dimethoxy-diphenyl-disazo-o-ethoxy-amino phenol-o-amino benzoic acid This compound is made from dianisidine, o-phenetidine and o-amino benzoic acid.

Example 10

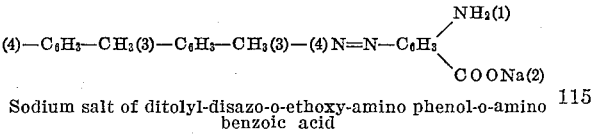

Sodium salt of ditolyl-disazo-o-ethoxy-amino phenol-o-amino benzoic acid

This compound is made from o-tolidine, o-phenetidine and o-amino benzoic acid.

Example 11

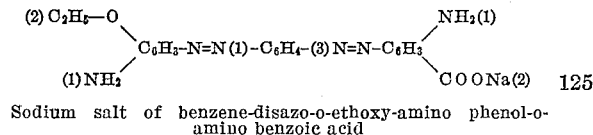

Sodium salt of benzene-disazo-o-ethoxy-amino phenol-o-amino benzoic acid

This compound is made from m-phenylene diamine, o-phenetidine and o-amino benzoic acid.

Example 12

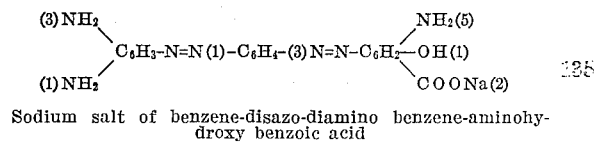

Sodium salt of benzene-disazo-diamino benzene-aminohydroxy benzoic acid

This compound is made by tetrazotizing m-phenylene diamine and coupling with m-phenylene diamine and 5-amino hydroxy benzoic acid.

Example 13

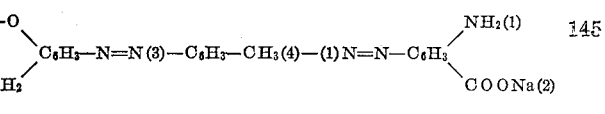

Sodium salt of toluene-disazo-o-ethoxy-amino phenol-o-amino benzoic acid

This compound is made from m-toluylene diamine, o-phenetidine and o-amino benzoic acid.

Example 14

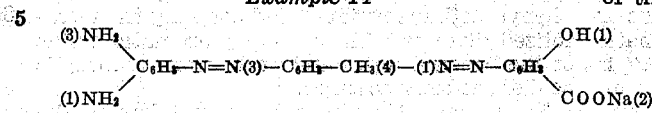

Sodium salt of toluene-disazo-diamino benzene-o-hydroxy benzoic acid

This compound is made from m-toluylene diamine, m-phenylene diamine and o-hydroxy benzoic acid.

Example 15

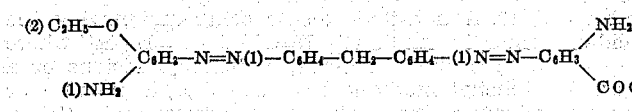

Sodium salt of diphenyl methane-disazo-o-ethoxy-amino phenol-o-amino benzoic acid This compound is made from p-p'-diamino-diphenyl methane, o-phenetidine and o-amino benzoic acid.

Example 16

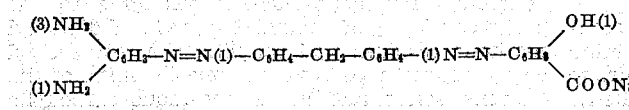

Sodium salt of diphenyl methane-disazo-diamino-benzene-hydroxy benzoic acid

This compound is made from p-p'-diamino diphenyl methane, m-phenylene diamine, and o-hydroxy benzoic acid.

Example 17

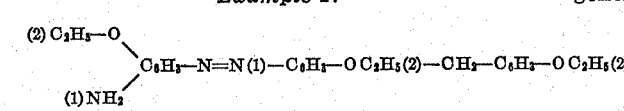

Sodium salt of diphenyl methane-diethoxy-disazo-o-ethoxy-amino phenol-amino hydroxy benzoic acid This compound is made from diamino-diethoxy-diphenyl methane, o-phenetidine, and 5-amino hydroxy benzoic acid.

Example 18

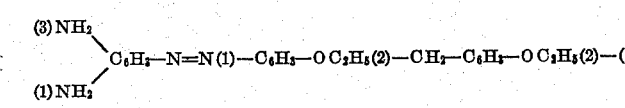

Sodium salt of diphenyl methane-diethoxy-disazo-diamino benzene-o-amino benzoic acid This compound is made from diamino-diethoxy-diphenyl methane, m-phenylene diamine and o-amino benzoic acid.

I claim:

1. A non-toxic disazo compound having the general formula R'—N=N—R—N=N—R" where R is a phenyl residue, a diphenyl residue, or a diphenyl methane residue, R' is an aromatic diamine or an alkoxy aromatic amine and R" is an amino or hydroxy monocarboxylic acid or an amino or hydroxy monocarboxylate both R' and R" being of the benzene series.

2. A non-toxic disazo compound having the general formula R'—N=N—R—N=N—R" where R is a phenyl residue, a diphenyl residue or a diphenyl methane residue, R' is an aromatic diamine and R" is an amino monocarboxylic acid or an amino monocarboxylate both R' and R" being of the benzene series.

3. A non-toxic disazo compound having the general formula R'—N=N—R—N=N—R" where R is a phenyl residue, a diphenyl residue or a diphenyl methane residue, R' is an alkoxy aromatic amine and R" is an amino carboxylic acid or an amino carboxylate both R' and R" being of the benzene series.

4. A non-toxic disazo compound having the general formula R'—N=N—R—N=N—R" where R is a phenyl residue, a diphenyl residue or a diphenyl methane residue, R' is an aromatic diamine and R" is an hydroxy monocarboxylic acid or an hydroxy monocarboxylate both R' and R" being of the benzene series.

5. A non-toxic disazo compound having the general formula R'—N=N—R—N=N—R" where R is a phenyl residue, a diphenyl residue or a diphenyl methane residue, where R' is an alkoxy aromatic amine and R" is an hydroxy carboxylic acid or an hydroxy carboxylate both R' and R" being of the benzene series.

6. A non-toxic disazo compound having the general formula R'—N=N—R—N=N—R" where R is a phenyl residue, R' is an aromatic diamine or an alkoxy aromatic amine, and R" is an amino or hydroxy monocarboxylic acid or an amino or hydroxy monocarboxylate both R' and R" being of the benzene series.

7. A non-toxic diazo compound having the general formula R'—N=N—R—N=N—R" where R is a diphenyl residue, R' is an aromatic diamine or an alkoxy aromatic amine, and R" is an amino or hydroxy carboxylic acid or an amino or hydroxy carboxylate both R' and R" being of the benzene series.

8. A non-toxic disazo compound having the general formula R'—N=N—R—N=N—R" where R is a diphenyl methane residue, R' is an aromatic diamine or an alkoxy aromatic amine, and R" is an amino or hydroxy monocarboxylic acid or an amino or hydroxy monocarboxylate both R' and R" being of the benzene series.

9. The sodium salt of diphenyl-disazo-o-ethoxy-amino phenol-o-amino benzoic acid.

10. The sodium salt of benzene-disazo-o-ethoxy-amino phenol-o-amino benzoic acid.

11. The sodium salt of diphenyl-disazo-diamino benzene-o-amino benzoic acid.

12. A disazo compound being yellow to brown in color, having a bactericidal value of at least 1 to 1500 and a bacteriostatic value of at least 1 to 2000 and having the general formula

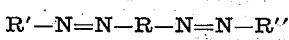

where R is a phenyl residue, a diphenyl residue or a diphenyl methane residue, R' is an aromatic diamine or an alkoxy aromatic amine and R'' is an amino or hydroxy monocarboxylic acid or an amino or hydroxy monocarboxylate both R' and R'' being of the benzene series.

13. The method of preparing a disazo compound, which comprises tetrazotizing a diamino compound having a nucleus belonging to the group consisting of phenyl, diphenyl and diphenyl methane residues and coupling the tetrazotized compound with an aromatic diamine of the benzene series and an amino monocarboxylic acid of the benzene series.

14. The method of preparing a disazo compound, which comprises tetrazotizing a diamino compound having a nucleus belonging to the group consisting of phenyl, diphenyl, and diphenyl methane residues and coupling the tetrazotized compound with an alkoxy aromatic amine of the benzene series and an amino carboxylic acid of the benzene series.

15. The method of preparing a disazo compound, which comprises tetrazotizing a diamino compound having a nucleus belonging to the group consisting of phenyl, diphenyl, and diphenyl methane residues and coupling the tetrazotized compound with an aromatic diamine of the benzene series and an hydroxy monocarboxylic acid of the benzene series.

16. The method of preparing a disazo compound, which comprises tetrazotizing a diamino compound having a nucleus belonging to the group consisting of phenyl, diphenyl, and diphenyl methane residues and coupling the tetrazotized diamine with an alkoxy aromatic amine of the benzene series and an hydroxy carboxylic acid of the benzene series.

17. A non-toxic disazo compound having the general formula R'—N=N—R—N=N—R'' where R is a phenyl residue, a diphenyl residue or a diphenyl methane residue, R' is an alkoxy aromatic amine and R'' is an amino-mono-carboxylic acid or an amino-mono-carboxylate, both R' and R'' being of the benzene series.

18. A non-toxic disazo compound having the general formula R'—N=N—R—N=N—R'' where R is a phenyl residue, a diphenyl residue or a diphenyl methane residue, R' is a diamine or alkoxy amine of the benzene series and R'' is a benzene nucleus substituted only with an amino or hydroxy, or amino and hydroxy group, and one carboxylic acid or carboxylate group.

19. The method of preparing a disazo compound which comprises tetrazotizing a diamino compound having a nucleus belonging to the group consisting of phenyl, diphenyl and diphenyl methane residues and coupling the tetrazotized compound with an alkoxy aromatic amine of the benzene series and an amino-mono-carboxylic acid of the benzene series.

JOSEPH EBERT.